J. NEWMAN & N. BROWN.
Bee-Hives.
No. 136,933. Patented March 18, 1873.
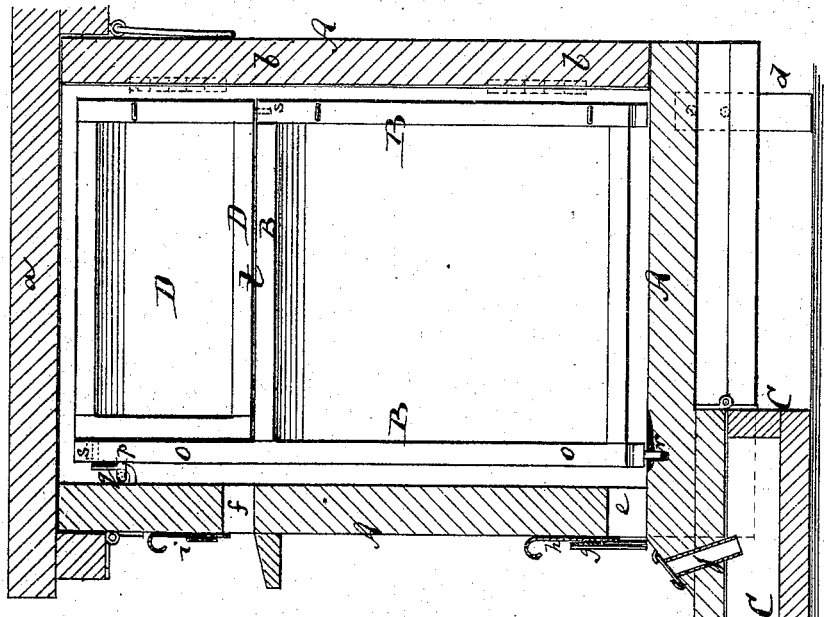
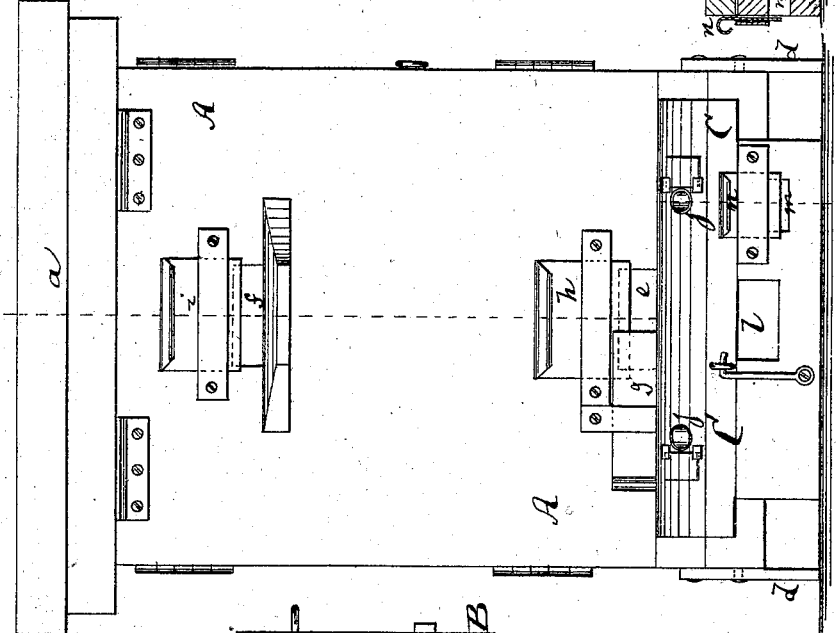
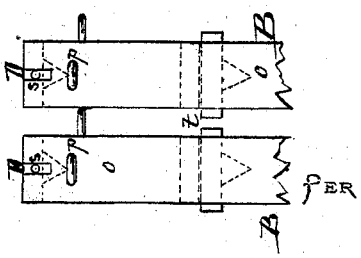
Witnesses:
E. Wolff
Sedgwick
Inventor:
J. Newman
N. Brown
Attorneys.

UNITED STATES PATENT OFFICE

JOSEPH NEWMAN AND NOAH BROWN, OF ROSSVILLE, ILLINOIS.

IMPROVEMENT IN BEE-HIVES.

Specification forming part of Letters Patent No. 136,933, dated March 18, 1873.

*To all whom it may concern:*

Be it known that we, JOSEPH NEWMAN and NOAH BROWN, of Rossville, in the county of Vermillion and State of Illinois, have invented a new and Improved Bee-Hive, of which the following is a specification:

Figure 1 is a front elevation of our improved bee-hive. Fig. 2 is a vertical section thereof on the line $c\,c$, Fig. 1. Fig. 3 is a detail end view of the upper part of two honey-frames.

Similar letters of reference indicate corresponding parts.

Our invention relates to improvements in bee-hives; and consists in providing the lower bee-entrance with slides or gates, so arranged that it may be contracted vertically as well as horizontally, for excluding robber-bees and preventing the escape of the queen.

In the accompanying drawing, the letter A represents the case of the hive, made in prismatic form, of suitable size, preferably, however, eighteen inches high and twelve by thirteen horizontal area, inside measure. Of this size the same would accommodate eight frames B B, measuring one and one-half inch from center to center. If the number is increased add one and one-half inch to the width of the hive for each additional frame. The top $a$ of the hive is hinged thereto, and can be swung open when desired. The back $b$ and side of the hive are also hinged, and can be swung open. The hive is supported partly by the moth-trap C, and in part by legs $d\,d$, which are fastened to it by screws. The moth-trap C can be removed, and the legs $d\,d$ can be turned vertically on the side of the hive by removing the upper screw of each, when desired to house or transport, so it will occupy less room than ordinary hives of equal capacity. In front the hive has two entrance-openings, $e$ and $f$, one, $e$, directly above the bottom, and the other, $f$, in line with the lower part of the honey-frames D. The bees are thus enabled to enter the upper honey-department without having to climb to it within the hive, thereby saving considerable time, as they can fly several hundred yards in the time in which they could climb the hive. This entrance $f$ is provided with a tin slide, $i$, so that it can be partly or entirely closed at pleasure. The lower opening $e$ can be more or less closed by a slide, $g$, moving horizontally, and also by a slide, $h$, moving vertically. The vertical slide $h$ is used to so reduce the opening at the swarming season as to prevent the escape of the queen-bee; also at other times to exclude the drones, always, however, permitting free entrance and exit of the working-bees. The slide $g$ is used to so reduce the length of the opening $e$ that the same can be more easily defended against robber-bees. The moth-trap C can be entered through two inclined openings, $j\,j$, which extend from a beveled piece on the top board of the trap. The moth-millers, being resisted by the bees when attempting to enter the hive at $e$, find the openings $j\,j$, and descend into the trap, which they find light, owing to a pane of glass in front of the trap. Then they can be destroyed by suitable means. In case of superabundance of drone-bees, the moth-trap may be converted into a drone-trap by enlarging the openings $j\,j$. By contracting the entrance $e$, the drones, being excluded from the hive, pass through the opening $j$ into the trap, where they can be destroyed; if working-bees should enter the trap they may escape through the opening $m$, which can be contracted by a gate, $n$, in order to retain the drones. The frames B are set up within the hive side by side; one upright, $o$, of each extends up near to the top of the hive, and is by a loop, $p$, connected with a pin, $q$, that is secured in the side of the hive. The lower end of the same upright has a projecting pin, $r$, which enters a socket in the bottom of the hive, which has a groove, Fig. 2, to guide the pin $r$ into it, and thus enable the frames to be quickly adjusted in place. Thus the frame B is actually hinged, but can be withdrawn from above without difficulty. Each socket is provided with a groove to facilitate the entering of the pin in frame B into the socket. The upper honey-frames D are, respectively, rested upon the frames B, as shown in Fig. 2, and steadied thereon by projecting pins $s\,s$ at bottom and ends entering sockets in the frames B, all as clearly shown in Figs. 2 and 3. The frames D can thus also be removed from above. The upper slat of each frame B is made so much wider than the remaining parts of said frames, that at that height the spaces between the series of frames are contracted, forming narrow throats, through which the working-bees can pass, but not the queen. The latter will thus be effectually excluded from the honey-frames, which will be preserved for the purpose for which they were originally intended. In ordinary hives the queen-bees often enter the honey-frames and deposit eggs therein. The top slat of each of the frames B and D are provided underneath with a small triangular slat for a comb-guide.

Having thus described our invention, we claim as new and desire to secure by Letters Patent—

The slides or gates $g$ and $h$ applied to the hive-entrance $e$, to permit the contraction of the same vertically as well as horizontally, as and for the purpose specified.

JOSEPH NEWMAN.
NOAH BROWN. [L. S.]

Witnesses:
EMORY BIRCH,
HUGH A. ALLEN.